(No Model.)
J. LEDWARD.
SAW.
No. 309,550. Patented Dec. 23, 1884.
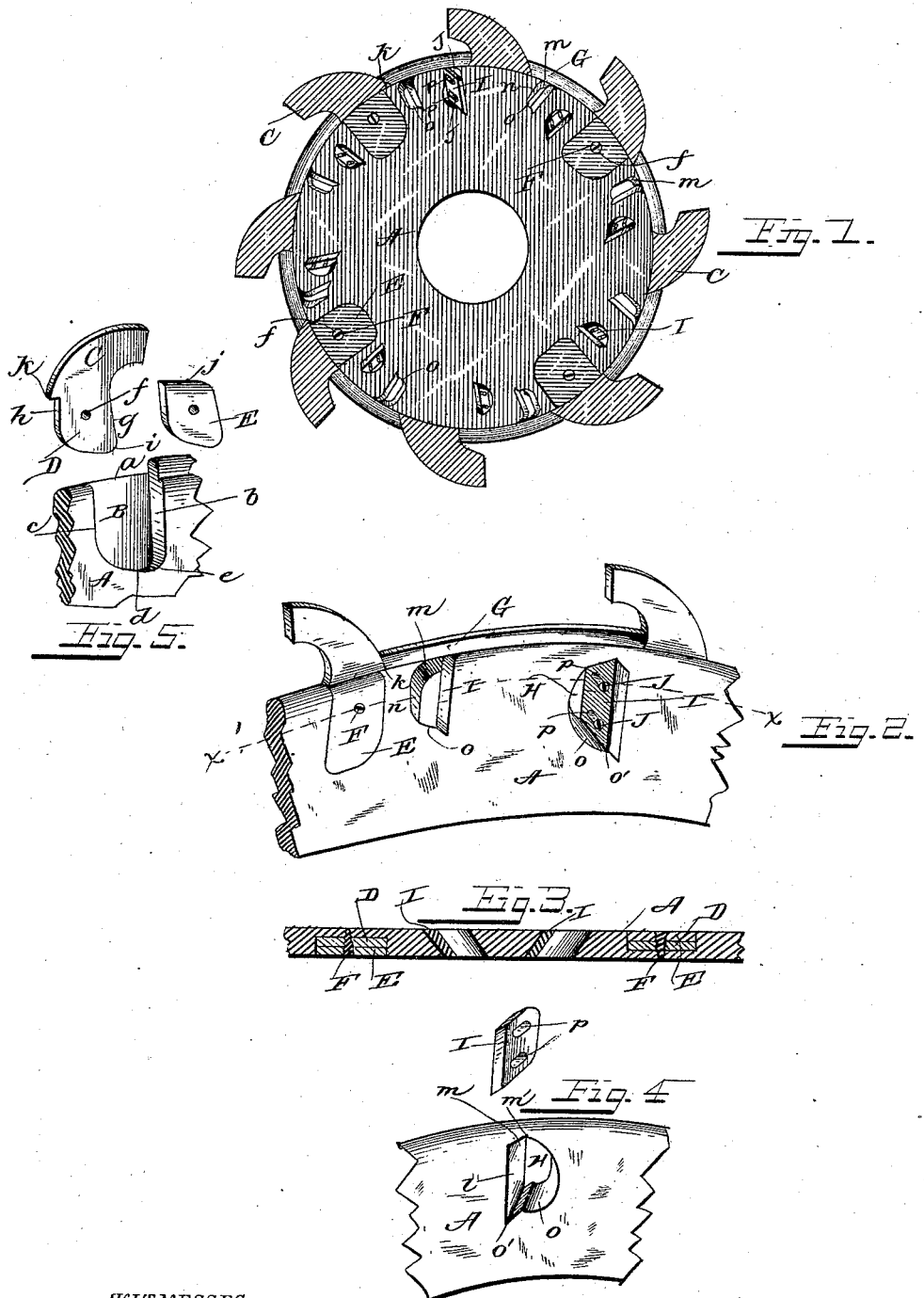

UNITED STATES PATENT OFFICE.

JOSEPH LEDWARD, OF WESTERLY, RHODE ISLAND, ASSIGNOR TO PHEBE I. LEDWARD, OF SAME PLACE.

SAW.

SPECIFICATION forming part of Letters Patent No. 309,550, dated December 23, 1884.

Application filed September 25, 1884. (No model.)

*To all whom it may concern:*

Be it known that I, JOSEPH LEDWARD, a citizen of the United States, residing at Westerly, in the county of Washington and State of Rhode Island, have invented a new and useful Improvement in Saws, of which the following is a specification, reference being had to the accompanying drawings.

This invention relates to saws, and it has for its object to provide an improved manner of attaching the teeth to the blade, so as to be held securely in position, and when worn out they can be replaced by new teeth; and a further object of the invention is to adapt the blade to smooth or plane either one or both sides of the slit or opening made by the ordinary operation of the saw by providing an improved plane-iron, attached at intervals to the saw-blade, the attachment being adjustable in or out, forward or backward, and thus when the plane-iron becomes dull it may be detached from the blade and ground, and then inserted in its proper place, the cutting-edge being caused to project any desired distance from the blade, as found expedient and desirable.

With these and other objects in view, the said invention consists in certain details of construction and combination of parts, as hereinafter set forth, and particularly pointed out in the claims.

In the accompanying drawings, Figure 1 is a front elevation of a circular saw-blade with my improvements applied thereto. Fig. 2 is a detail perspective view of a portion of a saw-blade. Fig. 3 is a section on the line $x\,x$, Fig. 2. Fig. 4 is a detail view of a portion of a saw-blade, showing the throat or opening therein to receive the plane-iron, the latter being detached. Fig. 5 is a view of a detached portion of the blade with the tooth and cap removed.

Like letters are used to indicate corresponding parts in the several figures.

Referring to the drawings, A designates the saw-blade, which in this instance I have shown as circular in form, and provided with recesses or slots B B, cut therefrom, but not entirely through the blade, one side of the recess or slot being closed, as seen at $a$. These recesses or slots are made in the saw at suitable intervals, to correspond with the arrangement of teeth in the saw, the front wall, $b$, of the slot or recess being inclined, and the rear wall, $c$, being curved down around the bottom $d$, and meeting the inclined front wall at the rounded point $e$.

C designates the teeth of the saw, having the projecting cutting-edge of any suitable form, and the shanks D, formed or shaped to fit within the recesses or slots B in the blade, the sides of the shanks being flat and provided with a hole or perforation, $f$, to allow the passage of the fastening-screw. The front edge, $g$, of the shank is inclined, as shown, and its rear edge, $h$, curved from the side down along the bottom, and meeting the inclined front edge at the point $i$. When the teeth are fitted within the recesses or slots, the curved and inclined edges of the shanks correspond and fit against the curved and inclined walls of the recesses, the rounded point $i$ of the shanks bearing against the rounded meeting-point $e$. Since the depth of the recesses or slots is greater than the width of the shanks of the teeth, a space is left to receive caps E E. The latter in general form correspond with the shape of the shanks D, having an inclined front edge, curved rear edge meeting the other at a rounded point, and flat sides, the upper outer edge of the caps being rounded of at $j$ to coincide with the shape of the blade. A fastening-screw, F, passes through a hole in the caps through the hole $f$ in the shanks of the teeth, and enters a hole in the closed wall $a$ of the recesses or slots, and in this manner serving to provide additional means for holding the teeth from displacement.

It will be seen that the peculiar construction of the slots or recesses in the blade, in connection with the correspondingly-shaped shanks for the teeth, enables the latter to have a firm hold or bearing therein, so as to successfully resist forward or backward movement of the teeth, while the caps and fastening-screw will hold the same from lateral and upward motion.

It will be observed that the teeth may be detached at will by removing the screw and withdrawing the cap, when the teeth are slipped out of position, so that when they become worn they can be replaced by new ones.

The periphery of the saw-blade is provided with a rib or projection, G, formed therewith, and smaller in width than the blade, portions of the rib or projection being cut out at the slots or recesses B to allow the passage of the shanks D of the teeth. The shank D has its rear edge, h, at the outer end thereof, provided with an overlapping flange, k, which fits over the outer periphery of the saw-blade against the rib or projection, and thus provides additional holding means for the teeth.

H designates inclined throats or openings cut through the saw-blade between the teeth, one side wall of the throat being cut obliquely inward in a vertical line, the top wall, m, slanting downward, the other side wall, n, and the bottom wall, o, partaking of the form of a spiral curve inclining inward and downward. The bottom wall, o, is diagonally recessed at o', and the top wall, m, is correspondingly recessed at m', to receive the upper and lower inclined edges of the plane-iron I. The latter has its cutting-edge projecting beyond the face of the blade and in the same direction as the saw-teeth, elongated slots p p being provided in said plane-iron to receive binding-screws J J, working into openings of the blade. As will be seen, by loosening the screws the plane-iron may be shifted forward or backward and held at any point by screwing the heads of the screws down tight in position. Thus, when the plane-iron becomes dull, it may be detached by removing the screws, sharpened, and then introduced into its proper place. As a portion of the plane-iron has been ground away, it will be necessary to adjust its cutting-edge farther outward as well as forward, and this can be done by sliding the same to the desired point and holding it to its place by the binding-screws J. As will be understood, the recesses o' m' in the bottom and top walls of the throat H provide ways for the plane-iron to slide in, and also to hold the same in its proper position. The rib or projection G serves as a support for that portion of the blade above the plane-iron. It will also be seen that the peculiar spiral throat or passage forward of the plane-iron, and inclining inward and down, serves to throw the shavings or sawdust toward the center of the saw-blade, so as not to clog up the cut or slit made by the saw, and thus there will be no liability of it interfering with the free movement of the saw.

My improved saw is simple in construction and efficient in operation. The improvements may be applied to circular, jig, band, and other saws with equal effect.

Since there are two planing-irons between each two teeth, the cutting-edge of one projecting out through one side of the saw-blade, and the cutting edge of the other extending out from the opposite side, it will be seen that both sides of the slit or cut made by the teeth of the saw will be planed or smoothed. However, I do not wish to limit myself to this arrangement, since there may be only one planing-iron between each two teeth; or all the planing-irons may extend in the same direction, so as to plane either one of the sides of the cut or slit.

The adjustment of the planing-irons is effected with ease and rapidity. They can be removed, replaced, and adjusted in a very short time. The teeth of the saw are also capable of rapid adjustment.

I would have it understood that I do not wish to be limited to the mere details of construction, as such may be varied at will without departing from the spirit or scope of the invention.

Having described my invention, I claim—

1. In a saw, the blade having recesses or slots formed therein, but not entirely through the blade, so that one side of the recess is closed at a, in combination with the teeth having their shanks received within the recesses against the closed wall, caps having substantially the same form as the shanks, fitted within the remaining space of the slots against the shanks, so as to be flush with the face of the blade, and suitable fastening-screws passing through the caps and shanks into the wall a, as set forth.

2. In a saw, the combination, with the blade having recesses or slots formed therein, one side or wall of the recess being inclined, and the other side or wall curved downward along the bottom and meeting the inclined wall, of the teeth having their shanks correspondingly formed to fit the recesses or slots, and caps secured against the shanks by screws, as set forth.

3. In a saw, the blade having recesses or slots formed therein, and provided with a rib or projection extending from its periphery, in combination with the teeth having their shanks fitted within the recesses or slots, and flanges projecting from the rear edge of the shanks, and fitting over the peripheral edge of the blade against the rib or projection, as and for the purpose set forth.

4. In a saw, the blade having throats or openings formed therein, in combination with the planing-arms, adjustably attached to one of the walls of said throats or openings, the portion of the said throats or openings forward of the planing-irons providing a downward and inward passage for shavings and the like, for the purpose set forth.

5. In a saw, the blade having throats or openings formed therein, the upper and lower walls of which are recessed or grooved, as described, in combination with the planing-irons, having their upper and lower edges sliding within the groove and arranged against one of the walls of the throats or openings, elongated slots provided in the planing-irons, and headed binding-screws projecting from the said walls and fitting within the slots, as and for the purpose set forth.

6. In a saw, the blade having throats or openings formed therein, one side wall of which is straight, the top wall inclined upward, and the other side wall and bottom partaking of the form of a spiral curve, in combination with the planing-irons sliding in the top and bottom walls of the throats, and means, substantially as described, for adjusting the cutting-edge forward as well as outward, as set forth.

7. In a saw, the blade having throats or openings formed therein, one of the walls being straight and the others forming a spiral or compound curve, in combination with the planing-irons, adjustably secured to the straight walls, so that the cutting-edge may be adjusted forward as well as outward, as set forth.

In testimony that I claim the foregoing as my own I have hereto affixed my signature in presence of two witnesses.

JOSEPH LEDWARD.

Witnesses:
 EUGENE B. PENDLETON,
 ERNEST BARNS.